(12) United States Patent
Liu et al.

(10) Patent No.: US 11,587,305 B2
(45) Date of Patent: Feb. 21, 2023

(54) SYSTEM AND METHOD FOR LEARNING SENSORY MEDIA ASSOCIATION WITHOUT USING TEXT LABELS

(71) Applicant: FUJIFILM Business Innovation Corp., Tokyo (JP)

(72) Inventors: Qiong Liu, Cupertino, CA (US); Ray Yuan, San Ramon, CA (US); Hao Hu, Orlando, FL (US); Yanxia Zhang, Cupertino, CA (US); Yin-Ying Chen, San Jose, CA (US); Francine Chen, Menlo Park, CA (US)

(73) Assignee: FUJIFILM Business Innovation Corp., Tokyo (JP)

( * ) Notice: Subject to any disclaimer, the term of this patent is extended or adjusted under 35 U.S.C. 154(b) by 1001 days.

(21) Appl. No.: 16/353,991

(22) Filed: Mar. 14, 2019

(65) Prior Publication Data
US 2020/0293826 A1    Sep. 17, 2020

(51) Int. Cl.
*G06V 10/774* (2022.01)
*G06K 9/62* (2022.01)
*G06N 3/04* (2023.01)
*G06N 3/08* (2023.01)
*B25J 9/00* (2006.01)

(52) U.S. Cl.
CPC ....... *G06V 10/7747* (2022.01); *G06K 9/6257* (2013.01); *G06K 9/6259* (2013.01); *G06N 3/0454* (2013.01); *G06N 3/08* (2013.01); *G06V 10/7753* (2022.01); *B25J 9/00* (2013.01)

(58) Field of Classification Search
CPC .... G06N 3/08; G06N 3/0454; G06V 10/7747; G06V 10/7753; B25J 9/00
See application file for complete search history.

(56) References Cited

U.S. PATENT DOCUMENTS

| 5,097,326 A | 3/1992 | Meijer | |
|---|---|---|---|
| 10,789,427 B2* | 9/2020 | Shazeer | G06K 9/6227 |
| 2018/0144746 A1* | 5/2018 | Mishra | B60R 16/0373 |
| 2019/0005976 A1* | 1/2019 | Peleg | G10L 21/0232 |

OTHER PUBLICATIONS

Ngiam, et al. (Multimodal Deep Learning), pp. 1-8. (Year: 2011).*

(Continued)

*Primary Examiner* — Daniel G Mariam
(74) *Attorney, Agent, or Firm* — Propio, Cory, Hargreaves & Savitch LLP

(57) ABSTRACT

A computer-implemented method of learning sensory media association includes receiving a first type of nontext input and a second type of nontext input; encoding and decoding the first type of nontext input using a first autoencoder having a first convolutional neural network, and the second type of nontext input using a second autoencoder having a second convolutional neural network; bridging first autoencoder representations and second autoencoder representations by a deep neural network that learns mappings between the first autoencoder representations associated with a first modality and the second autoencoder representations associated with a second modality; and based on the encoding, decoding, and the bridging, generating a first type of nontext output and a second type of nontext output based on the first type of nontext input or the second type of nontext input in either the first modality or the second modality.

20 Claims, 12 Drawing Sheets
(8 of 12 Drawing Sheet(s) Filed in Color)

(56) References Cited

OTHER PUBLICATIONS

Sergeant, et al. (Multimodal Deep Autoencoders for Control of a Mobile Robot), pp. 1-10, Proc. of Australasian conf. (Year: 2015).*
"See What I Mean—a speech to image communication tool" Vimeo video; https://vimeo.com/75581546; published on 2014; retrieved on Mar. 14, 2019; 1 page.
Torfi, A. "Lip Reading—Cross Audio-Visual Recognition using 3D Convolutional Neural Networks—Official Project Page" GitHub; https://github.com/astorfi/lip-reading-deeplearning; retrieved on Mar. 14, 2019; 8 pages.
Chaudhury, S. et al., "Conditional generation of multi-modal data using constrained embedding space mapping" ICML 2017 Workshop on Implicit Models; 2017; 7 pages.
Vukotić, V. et al. "Bidirectional Joint Representation Learning with Symmetrical Deep Neural Networks for Multimodal and Crossmodal Applications" ICMR, Jun. 2016, 5 pages; New York, United States.
Kiros, R. "neural-storyteller" GitHub; https://github.com/ryankiros/neural-storyteller; retrieved on Mar. 14, 2019; 4 pages.
Shen, T. et al. "Style Transfer from Non-Parallel Text by Cross-Alignment" 31st Conference on Neural Information Processing Systems (NIPS 2017), 12 pages; Long Beach, CA, USA.
Van Den Oord, A. et al. "WaveNet: A Generative Model for Raw Audio" Sep. 19, 2016; 15 pages.
"Microsoft Azure Speaker Verification" https://azure.microsoft.com/en-us/services/cognitive-services/speaker-recognition/; retrieved on Mar. 14, 2019; 2 pages.
"Speaker Recognition API" https://docs.microsoft.com/en-us/azure/cognitive-services/speaker-recognition/home retrieved on Mar. 14, 2019; 2 pages.

* cited by examiner

300

700

800

801  803  805

SYSTEM AND METHOD FOR LEARNING SENSORY MEDIA ASSOCIATION WITHOUT USING TEXT LABELS

BACKGROUND

Field

Aspects of the example implementations relate to methods, systems and user experiences associated with learning sensory media association (e.g., audio and/or visual) without use of text labels.

Related Art

Related art deep learning techniques require large amounts of text labeled data. The text label data is created by a human labeler for training models. In the related art, the cost of performing the text labeling creates limitations on the use of deep learning technology in many real-world situations.

For example, use of related art deep learning techniques to create a customized product image data set with millions of image labels is tedious and costly, sometimes to the extent that it is prohibitive to performing such a task. Further, creating a detailed description of an image for a video with proper text labels, as is required for related art deep learning techniques, will also require a great cost in the form of human labelers expending tremendous amounts of time and resources on tasks such as record reviewing and typing.

Accordingly, there is an unmet need in the related art deep learning technology to collect real-time data and create data sets without related art costs and disadvantages associated with text labeling.

SUMMARY

According to aspects of the example implementations, a computer-implemented method of learning sensory media association includes receiving a first type of nontext input and a second type of nontext input; encoding and decoding the first type of nontext input using a first autoencoder having a first convolutional neural network, and the second type of nontext input using a second autoencoder having a second convolutional neural network; bridging first autoencoder representations and second autoencoder representations by a deep neural network that learns mappings between the first autoencoder representations associated with a first modality and the second autoencoder representations associated with a second modality; and based on the encoding, decoding, and the bridging, generating a first type of nontext output and a second type of nontext output based on the first type of nontext input or the second type of nontext input in either the first modality or the second modality.

According to further aspects, the first type of nontext input is audio, and the second type of nontext input is an image. According to other aspects, the audio is sensed by a microphone and the image is sensed by a camera.

According to still other aspects, the first type of nontext input is one of audio, image, temperature, touch, and radiation, and the second type of nontext input is another of audio, image, temperature, touch, and radiation.

According to yet other aspects, the first type of nontext input and the second type of nontext input are provided to an autonomous robot for training.

According to additional aspects, text labels are not used, and the receiving, encoding, decoding, bridging and generating are language-independent.

According to still further aspects, a third type of nontext input is received, the third type of nontext input is encoded using a third autoencoder having a third convolutional neural network, the third autoencoder is bridged to the first autoencoder and the second autoencoder by the deep neural network that learns mappings between the third type of representation associated with a third modality and the first type of representation and the second type of representation, and a third type of nontext output is generated, without requiring retraining of the first autoencoder, the second autoencoder, the first convolutional neural network and the second convolutional neural network.

Example implementations may also include a non-transitory computer readable medium having a storage and processor, the processor capable of executing instructions for assessing whether a patent has a condition.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
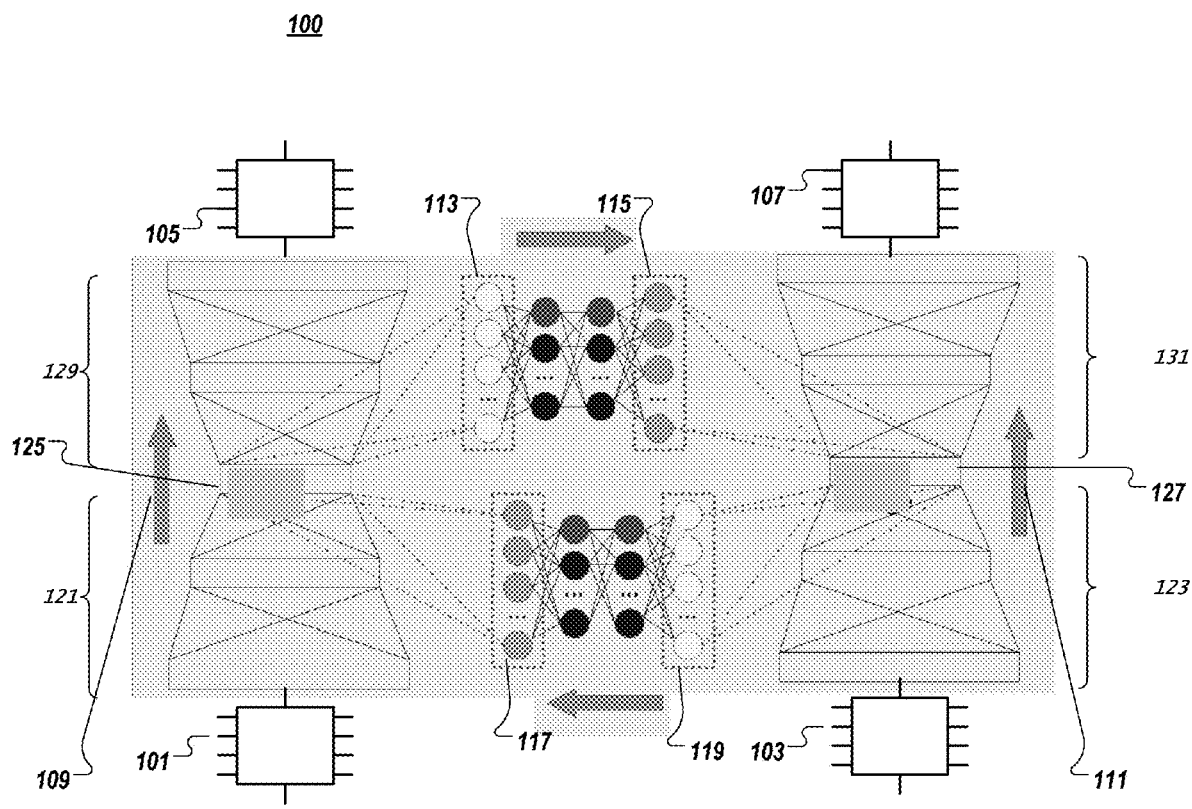
FIG. 1 illustrates an example implementation of the system and method.

The following detailed description provides further details of the figures and example implementations of the present application. Reference numerals and descriptions of redundant elements between figures are omitted for clarity. Terms used throughout the description are provided as examples and are not intended to be limiting.

There is an unmet related art need for tools that permit deep learning technology operations for machine learning of sensory media, without requiring text labels. As explained above, the related art approaches include a cost of obtaining text label data, which creates bottlenecks for many data demanding machine learning tasks. On the other hand, a human can learn cross media association without text labels (e.g., a child may be able to learn how to name an object without knowing open numeric characters, or an object may learn how to name an object in a language that he or she does not know, from an alphanumeric perspective).

Aspects of the example implementations are directed to cross-modal speech visual association, without text labels. While the related art approaches may use text as a bridge to connect speech and visual data, the example implementations are directed to machine learning that uses sensory media, in a non-textual manner, such as without keyboards.

By eliminating text, such as keyboard labelers, there may be various benefits and advantages. For example, but not by way of limitation, machine learning techniques may be performed in a manner that is more natural and more precisely mimics the human behavior, and will not be restricted by the related art limitations of keyboard labelers, such as schedule, cost, etc. As a result, the related art problem of insufficient training data for machine learning tasks may also be alleviated; moreover, a new zone of training data may become available.

Further, according to the example implementations, because there is no cost associated with text labeling, or the related complexities, it may be easier for ordinary consumers to be able to train systems in a manner that is not currently possible in related art systems. For example, but not by way of limitation, the example implementations may be useful to help individuals who are impaired with respect to sight or hearing, such that visual inputs may be provided as audio outputs for individuals with sight impairment, and audio inputs may be provided as visual outputs for individuals with hearing impairment.

According to an example implementation, plural deep convolutional autoencoders are provided. More specifically, one deep convolutional autoencoder is provided for a first nontext domain (e.g., learning speech representations), and another deep convolutional autoencoder is provided for a second nontext domain (e.g., learning image representations). Thus, hidden features can be extracted. The latent spaces of these autoencoders represent compact embeddings of speech and image, respectively. Thus, two deep networks are trained to bridge the latent spaces of the two autoencoders, which generates robust mappings for both speech to image an image to speech. Thus, audio can be converted to an image that a user can visualize. With these mappings, and image input can activate a corresponding speech output, and vice versa.

The example implementations associated with present inventive concept may be employed in various situations. For example but not by way of limitation, systems may be used to assist individuals with disabilities; further, autonomous robot training may be performed, and machine learning algorithms and systems may be generated that can use a large amount of low-cost training data. Further, machine learning systems may be employed that are not limited by the related art problems and disadvantages associated with text labelers, such as cost, schedule, etc.

In the present example implementations, a machine may be provided with sensors, such as cameras and microphones, which may collect real-time data on a continuous basis, similarly to how a human may sense the same information. Other sensors may be provided, such as thermometers associated with temperature sensing, pressure sensitive arrays associated with making a pressure map to sense touch, radiation sensors, or other sensors associated with sensed parameter information. The collected real-time data is used by the encoder and decoder architecture of the present example implementations. For example, the sensing device is may obtain usable data from normal daily activities, as well as from existing videos. Without the related art restrictions of having such data being labeled by human text labelers as in the related art approaches, the example implementations can continuously sense and observe information of the environment, and learn from the environment.

FIG. 1 illustrates an example implementation of the architecture 100. More specifically, an audio input 101 and an image input 103 are provided, which may receive information from devices such as microphones and cameras, respectively. The example implementation includes an encoder and decoder architecture, which are used for each of the audio module and the image module, to learn audio representations and image representations, respectively. Through an encoding process 109, an audio output 105 is generated, and through an encoding process 111, an image output 107 is generated. Because the audio module uses audio signals as training inputs and outputs, it does not require text labels to train the deep network. Similarly, the image module uses images as inputs and outputs of the network, and also does not require text labels.

With representations between each pair of encoder and decoder, one neural network is used to map audio representation 113 to the image representation 115, and another neural network is used to map the image representation 119 to the audio representation 117. According to the present example implementation having the foregoing arrangement and learning parameters, and audio input can activate an audio output, as well as an image output. Conversely, an image input can activate an image output, as well as an audio output.

More specifically, according to the example implementations, for each of the modalities (two modalities are illustrated in FIG. 1, but the example implementations are not limited thereto, and additional modalities may be provided, as explained herein), the autoencoder includes respective encoder portions 121 and 123 which received the respective inputs 101 and 103, in this case audio and video modalities, respectively. After several layers of the encoder portions 121 and 123 have been applied to input information, first modality representations are generated as shown at 125, and second modality representations are generated as shown at 127.

The first and second modality representations at 125 and 127 are then provided to the deep neural networks to perform the cross modal bridging, such as mapping from first modality representation 113 to second modality representation 115, or mapping from second modality representation 119 to first modality representation 117. The sending and receiving of the representations is shown by the broken lines extending from the representations 125 and 127.

Further, decoder portions 129 and 131 are provided so as to decode the respective first and second modality representations at 125 and 127, which include the results of the cross modal bridging, as explained above. After several layers of decoder portions 129 and 131 have been applied to the first and second modality representations at 125 and 127, the outputs are generated at 105 and 107, respectively.

The foregoing example implementation may be used with different input-output combinations. For example, but not by way of limitation when the foregoing architecture does not have information about pairing between an audio input and a learned audio output, the example implementations may feed the input signal to both the input and the output of the audio module, and may use an autoencoder learning procedure to learn the representation. When the pairing information between an audio input and an existing audio output is known, the example implementation may learn to associate the audio input and the existing audio output through the autoencoder. When the audio output and the image output are both available, the example implementation may use both outputs and the audio input for training. Conversely, a similar approach that uses the example implementation architecture may also be applied to train the image module, in a similar manner.

The example implementations learn relations between images and audio clips. More specifically, pairing info between audio clips and images is presented to the system associated with the example implementations. The pairing according to the example implementations is analogous to the pairing that occurs when one person teaches another person to name an object. Thus, the example implementation provides the machine learning with a more natural learning approach. With the pairing information provided by a teacher of the machine, corresponding parameters in the network shown in FIG. 1 are trained.

More specifically, according to one example implementation, adversarial convolutional autoencoders are used for both image and audio learning modules to save low-level feature computation cost, and to reduce the number of training parameters, audio inputs are converted to 2-D MFCC representations, which are fed to a convolutional autoencoder. This conversion results in an audio learning module that is very similar to the image learning module. The autoencoder includes seven layers for its encoder and decoder, respectfully. However, the present example implementations are not limited thereto, and other numbers of layers may be substituted therefore, without departing from the inventive scope.

According to the example implementation, a 3×3 convolutional filter is used to process data at each convolutional layer. Without losing input fidelity, the autoencoder compresses the input audio, which according to one example may have 16,384 samples, 232 dimensions of the autoencoder middle layer. With this 32 dimension representation of the input, the example implementations may reconstruct similar audio, with the decoder, without audible distortions.

With respect to images, the 28×28 handwriting images are reshaped two 784 dimension vectors, and fed to image autoencoders. The image autoencoder has five fully connected layers, to reduce the input to a 32 dimension image representation. The 32 dimension image representation may be used to reconstruct the input image with the trained decoder.

Figure 2:
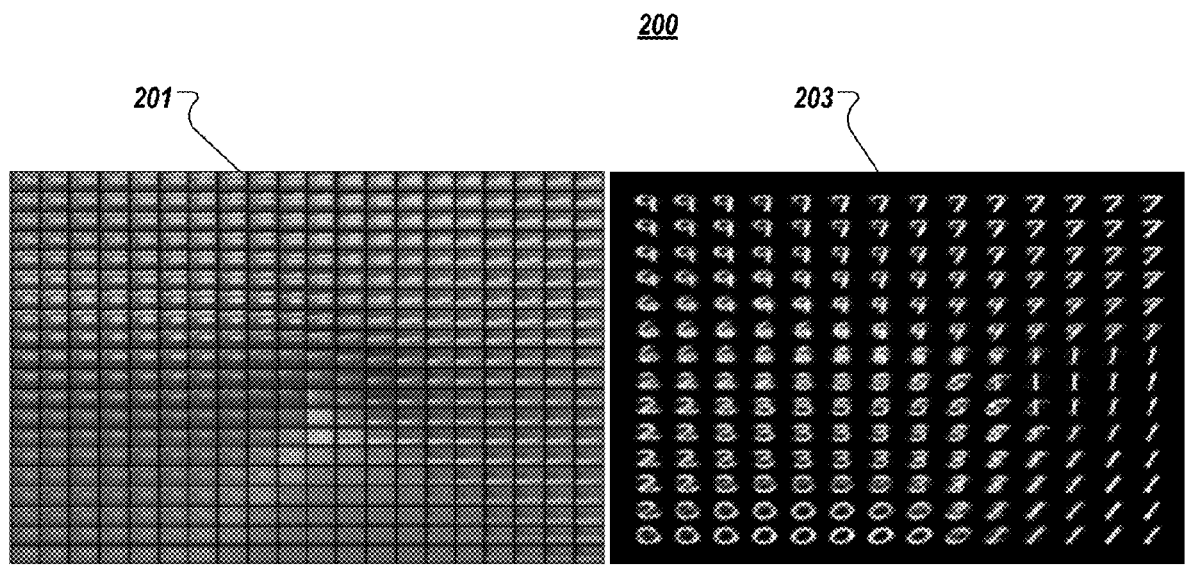
FIG. 2 illustrates results associated with the example implementation.

FIG. 2 illustrates spectrograms and images 200 that correspond to different hidden node values located on grids in latent spaces, when to hidden nodes are used. These drawings illustrate data clustering and latent spaces. At 201, an audio learning module output is provided in the form of spectrograms that correspond to different hidden node values. At 203, image learning module output images are provided that correspond to different hidden node values. Two node latent space is provided for visualization, although it may cause information loss and big distortion on outputs. To avoid such disadvantages and problems, and to keep the audio encoder output distortion small, the example implementations use 32 bit nodes, both for the audio learning module and the image learning module.

In order to learn mappings between the 32 node audio representation layer and the 32 node image representation layer, two five layer 512 node per layer, fully connected networks are used to learn mappings from audio to image and from image to audio, respectively.

The foregoing example implementation was applied to data in the following illustrative example. An NMIST handwriting digital data set, which has 60,000 training images and 10,000 testing images, and English spoken digital data set from FSDD, which has three speakers and 1500 recordings (50 of each digit per speaker) was used as training data for tuning the network parameters.

Figure 3:
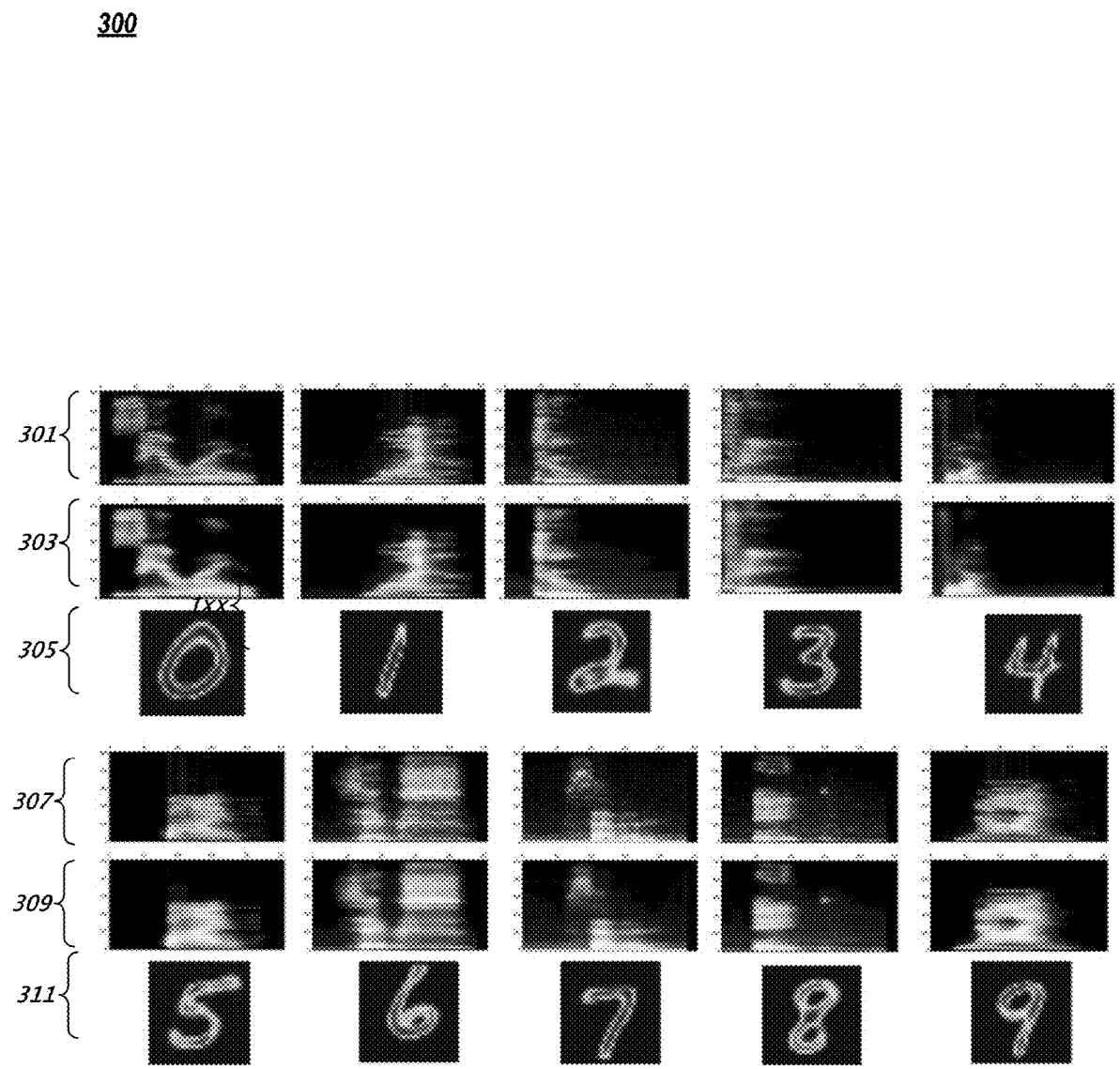
FIG. 3 illustrates results associated with the example implementation.

FIG. 3 illustrates examples 300 of input audio spectrogram 301, 307, corresponding audio learning module spectrogram outputs 303, 309, and corresponding output images 305, 311, which were generated with audio inputs, from the image decoder. When feeding the learning system with audio from different speakers, image outputs have small variations on digit outputs.

Figure 4:
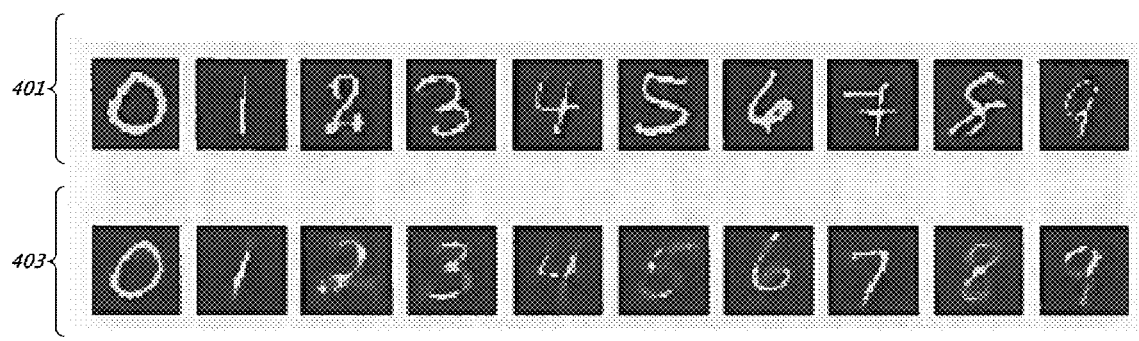
FIG. 4 illustrates results associated with the example implementation.

As shown in FIG. 4 at 400, typical handwriting images and speech activated images are provided as shown herein with image inputs 401 and image outputs 403, the output images may be more recognizable than the input images. This is particularly visible with respect to the digits 6, 7 and 8 as shown in FIG. 4.

Additionally, the 512 node latent space autoencoder was tested for both image to image module and audio to audio module, using an adversarial network to learn the mapping from image to audio.

Figure 5:
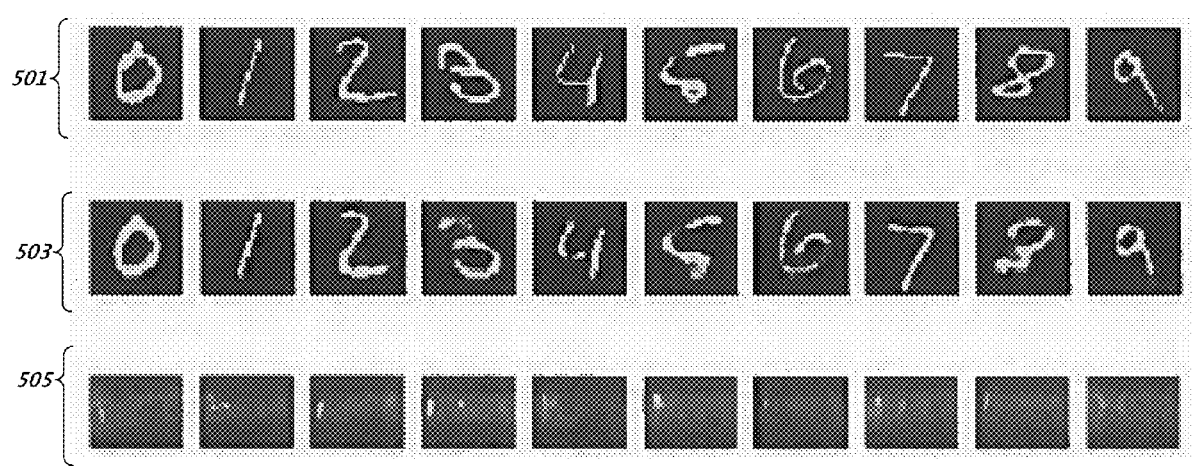
FIG. 5 illustrates results associated with the example implementation.

As shown in FIG. 5 at 500, inputs 501 and outputs of the image learning module 503 and the corresponding audio spectrogram outputs 505 activated by the image input 501 are shown. The images shown in FIG. 5 illustrates that the image to image module can output images that are more similar to the image inputs, because of the latent space expansion.

Figure 6:
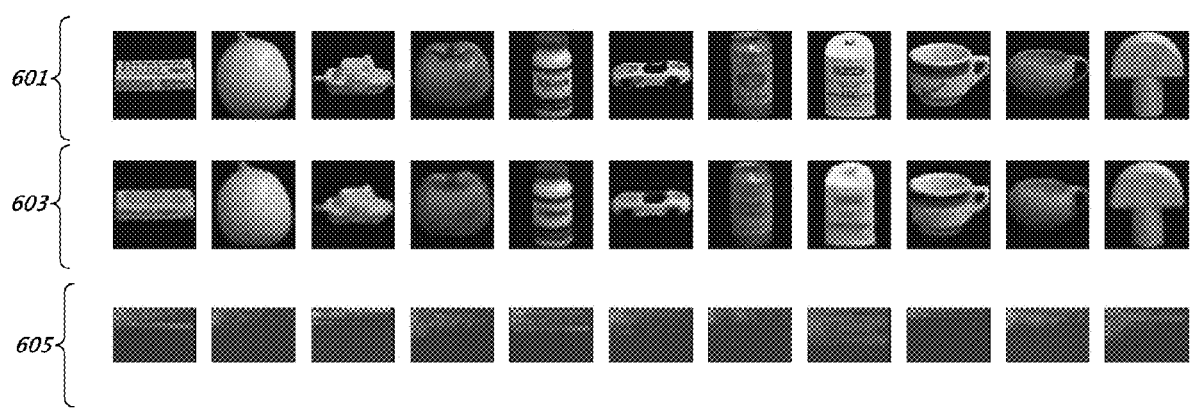
FIG. 6 illustrates results associated with the example implementation.

FIG. 6 shows test results 600 with a coil—100 data set, including inputs 601, autoencoder outputs 603 and speech outputs 605. Since the images in this data set are bigger, the convolutional autoencoder is used to extract 512 dimension features for representing the input image.

Further, using the Abstract Scene data set, speech information is generated for 10,000 128×128 images. Using the foregoing learning architecture, the image representation layer and the audio representation layer were scaled up to 1024 nodes each, respectively. Similarly, the audio to image and the image to audio mapping network with was increased from 512 to 2048, to handle increased data complexity.

Figure 7:
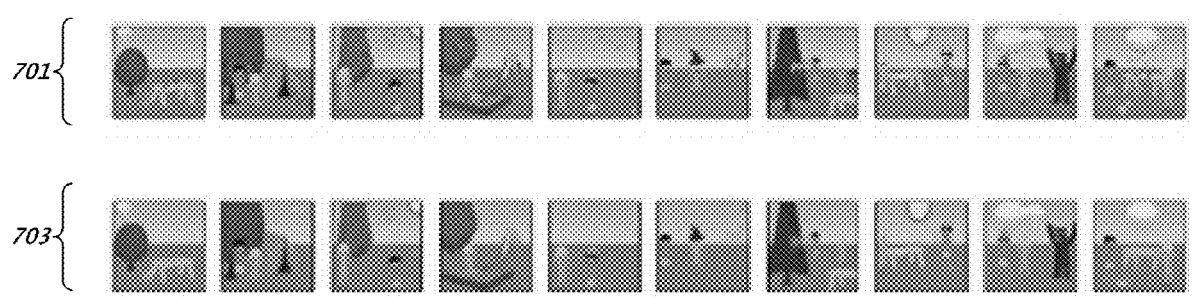
FIG. 7 illustrates results associated with the example implementation.

Results of this example are shown in FIG. 7 at 700. More specifically, the first row of FIG. 7 shows ground truth 701, and the second row shows audio generated images 703.

Figure 8:
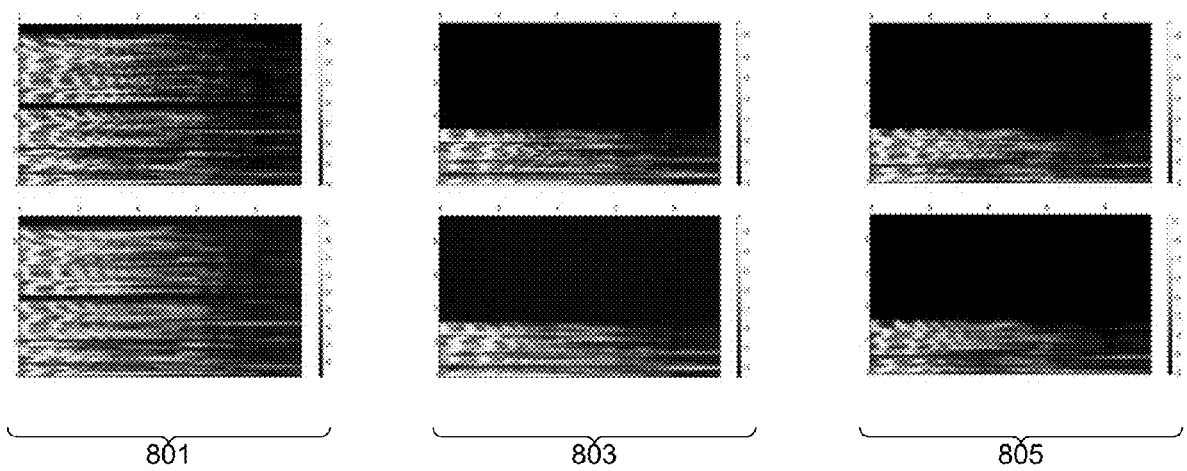
FIG. 8 illustrates results associated with the example implementation.

FIG. 8 shows MFCC coefficients 800 of three speech segments 801, 803, 805 that were generated with images. By asking witnesses to listen to image activated speech segments, a determination was made as to whether the speech segments were easy to understand.

To enhance training quality, the example implementation may employ a trainer having an ID as a token. For the mode of showing an image and then generating speech, the token may be a random speaker or a specified one. On the other hand, for the mode of speaking and then generating the image, the results should be independent of speaker, such that the example implementation may operate according to one or more of the following options.

According to one example implementation, separate encoder decoder models may be trained for the two cases. In other words, one of the encoder decoder models may be speaker independent, in other words directed to speech to image, and the other encoder decoder model may use a token, and be directed to image to speech.

According to another example implementation, a combined model may be trained, which uses tokens, and which also has the token set ID for all speakers. This combined model would train on each utterance twice. Alternatively, if there is a large quantity of data, utterances may be randomly assigned to either the speaker token or the "everyone" token.

According to yet another example implementation, a speaker ID may be used. However, according to this example implementation the speakers the system would pay attention to may be limited to those having a speaker ID. This approach may be useful in certain circumstances, for example at airports where an official may be attempting to match an individual to a photograph, and a more precise and quick determination may be made where there is a dialect sensor and a speaker ID associated with the individual. Using this approach, clustering in the audio module may be performed in an easier and cleaner manner.

The example implementations described herein may have various implementations and applications. As explained above, aspects of the example implementations may be used to build systems that may assist people with disabilities, especially those who may be able to provide a visual or audio output that does not involve typing or entering information from a keyboard or mouse that may require fine motor skills. Further, the example implementations may also be useful in fields such as autonomous robot training, which require the robot to learn about the audio and visual environment in a manner's similar to a human, so as to be able to perform safely and efficiently in the environment. Further, the example implementation may be directed to machine learning algorithms and/or systems that need a large amount of low-cost training data, as well as machine learning systems that do not intended to be limited by text labeling limitations, such as schedule, cost, etc.

According to one example implementation, a language independent device may be trained to assist a person with a hearing disability to determine the object of conversation by others around the person, or to use speech to tell a person who is visually impaired the physical surroundings of his or her environment.

Because text is not used in the present example implementations, the training system is also language independent, and can be used across countries, cultures and languages. Because the example implementations may include pluralities of sensors that are connected to a common network, users in the same region and speaking the same language may be able to train the system in a common manner.

According to another example implementation related to autonomous robot training, the example approach is advantageous over shared latent space, or function bounded latent spaces. More specifically, according to the example implementations, the de-coupling of latent spaces allows users to add more modalities in a machine at a later time without having the new modalities impact the old learned modalities. Instead, according to the example implementations, the new modalities will learn by themselves, and gradually build more connections with the old modalities.

For example, but not by way of limitation, the autonomous robot they initially have a sensor directed to visual aspects such as a camera, and another sensor directed to audio aspects such as a microphone. However, the user may wish to add additional sensors directed to other modalities, such as temperature, touch, radiation or other parameters that may be sensed in and environment. Those new modalities can be added to the example implementations without impacting the already present modalities (e.g., visual and audio), in a manner that cannot be accomplished in the related art. Further, the robots may permit learning associated with environments in which human operation is difficult, such as deep-sea, outer space, or the like.

According to one example implementation associated with a modality of touch, a robot may be taught how to grab an object, such as a bottle or glass. The robot may learn from its own training data associated with touch, to determine whether the object is being gripped with too little force or too much force. Because there is no text labeling concept, the robot may use its own output as a sensed input, or may learn from previously provided human training data.

Figure 9:
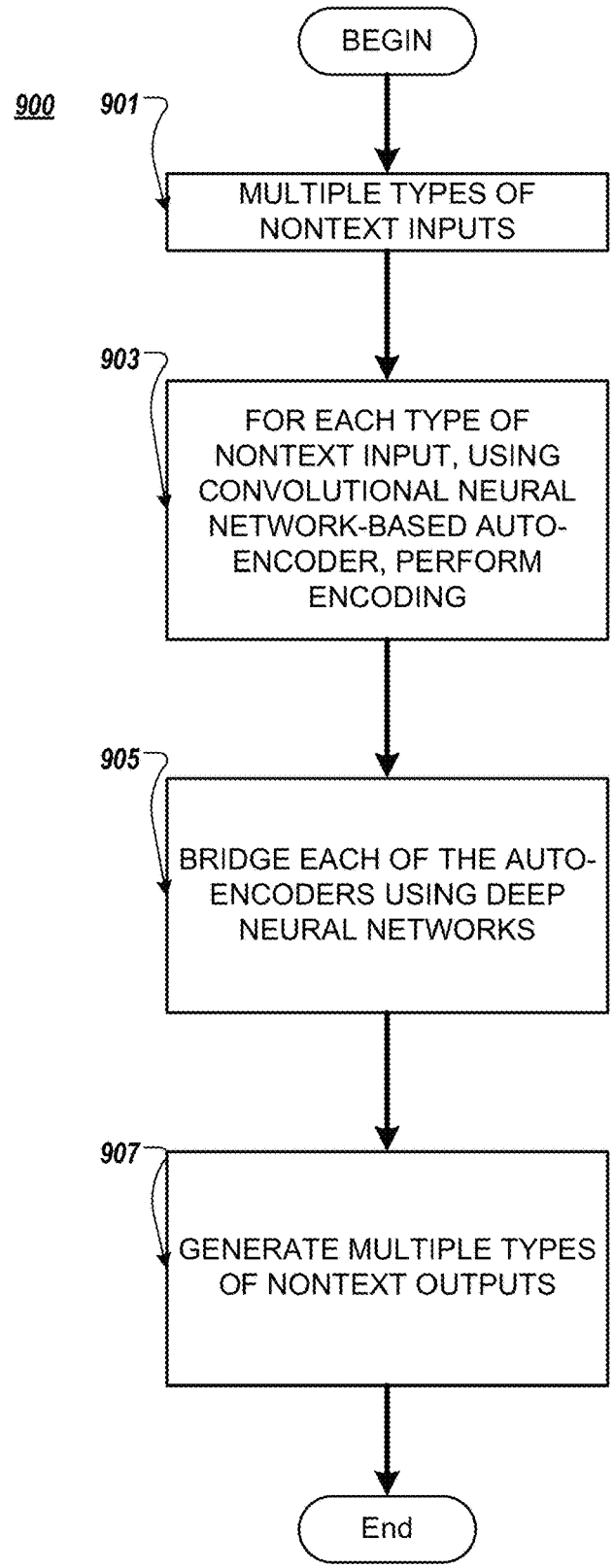
FIG. 9 illustrates an example process according to an example implementation.

FIG. 9 illustrates an example process 900 according to the example implementations. The example process 900 may be performed on one or more devices, as explained here.

At 901, nontext inputs of various types are received from sensing devices. For example, but not by way of limitation, an audio input may be received from a microphone as one type of nontext input, and an image input may be received from a camera as another type of nontext input. The example implementations are not limited to just two types of nontext inputs, and other nontext inputs, such as temperature, touch, radiation, video, or other input that is capable of being sensed may be included according to the example implementations.

At 903, auto encoding and decoding is performed for each of the types of nontext inputs for which the inputs have been received. The auto encoding and decoding may be performed using convolutional neural networks, for example. Thus, an audio input that was received from the microphone may be encoded by an autoencoder, and an image input that was received from the camera may be encoded by another autoencoder. The deep convolutional autoencoders that learn each of the respective types of nontext input representations may be used to generate outputs.

At 905, deep networks are used to bridge the latent spaces of the two deep convolutional autoencoders used at 903. More specifically, deep neural networks that learn mappings between the first modality representations and second modality representations are used to bridge the latent space between the autoencoder representations of the first type and the autoencoder representations of the second type. For example, but not by way of limitation, the deep networks are provided such that inter-conversion can be performed between inputs of an audio type and outputs of an image type, or vice versa. When audio output and an image output are both available, the example implementation may use both audio output and image output with the audio input for training; a similar approach may be taken with respect to the image input, when available. When pairing info nation is not available, autoencoder training can be performed using historical data.

At 907, based on the encoding, decoding, and the bridging, appropriate outputs including a first type of nontext output and a second type of nontext output, with nontext inputs in either the first modality or the second modality are generated for each of the types of nontext inputs. For example, an audio learning module output spectrogram or output images corresponding to various hidden note values may be provided as outputs. Examples of inputs and outputs are illustrated in the forgoing drawings, and also explained above in the description of the example implementations.

Figure 10:
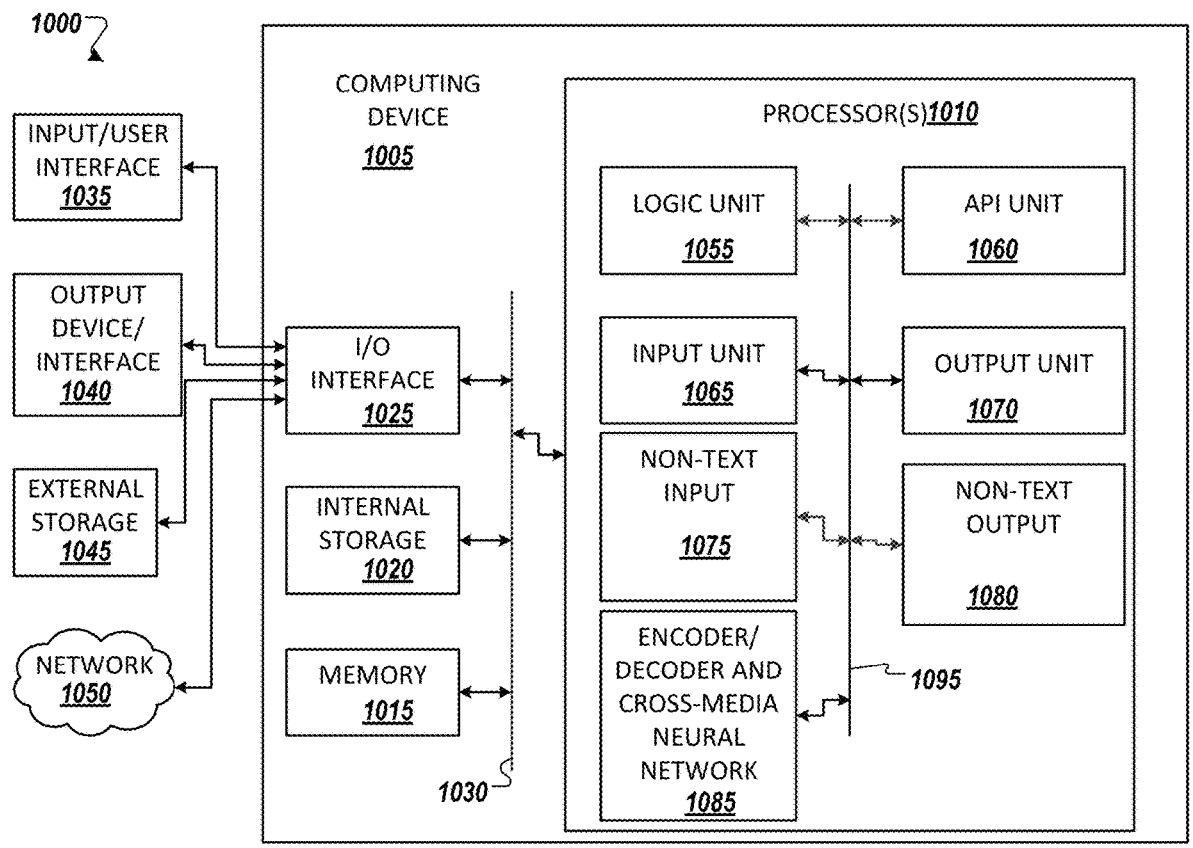
FIG. 10 illustrates an example computing environment with an example computer device suitable for use in some example implementations.

FIG. 10 illustrates an example computing environment 1000 with an example computer device 1005 suitable for use in some example implementations. Computing device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computing device 1005.

Computing device 1005 can be communicatively coupled to input/interface 1035 and output device/interface 1040. Either one or both of input/interface 1035 and output device/interface 1040 can be a wired or wireless interface and can be detachable. Input/interface 1035 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 1040 may include a display, television, monitor, printer, speaker, braille, or the like. In some example implementations, input/interface 1035 (e.g., user interface) and output device/interface 1040 can be embedded with, or physically coupled to, the computing device 1005. In other example implementations, other computing devices may function as, or provide the functions of, an input/interface 1035 and output device/interface 1040 for a computing device 1005.

Examples of computing device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 1005 can be communicatively coupled (e.g., via I/O interface 1025) to external storage 1045 and network 1050 for communicating with any number of networked components, devices, and systems, including one or more computing devices of the same or different configuration. Computing device 1005 or any connected computing device can be functioning as, providing services of, or referred to as, a server, client, thin server, general machine, special-purpose machine, or another label. For example but not by way of limitation, network 1050 may include the blockchain network, and/or the cloud.

I/O interface 1025 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computing device 1005 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1055, application programming interface (API) unit 1060, input unit 1065, output unit 1070, non-text input unit 1075, non-text output unit 1080, the encoder/decoder and cross-media neural network unit 1085, and inter-unit communication mechanism 1095 for the different units to communicate with each other, with the OS, and with other applications (not shown).

For example, the non-text input unit 1075, the non-text output unit 1080, and the encoder/decoder and cross-media neural network unit 1085 may implement one or more processes shown above with respect to the structures described above. The described units and elements can be varied in design, function, configuration, or implementation and are not limited to the descriptions provided.

In some example implementations, when information or an execution instruction is received by API unit 1060, it may be communicated to one or more other units (e.g., logic unit 1055, input unit 1065, non-text input unit 1075, non-text output unit 1080, and the encoder/decoder and cross-media neural network unit 1085).

For example, the non-text input unit 1075 may receive and process inputs such as images and sounds, and via processing of the encoder/decoder and cross-media neural network unit 1085 (e.g., using the foregoing, especially as disclosed above with respect to FIGS. 2 and 5), generate a respective image or sound output at the non-text output unit 1080.

In some instances, the logic unit 1055 may be configured to control the information flow among the units and direct the services provided by API unit 1060, input unit 1065, non-text input unit 1075, non-text output unit 1080, and encoder/decoder and cross-media neural network unit 1085 in some example implementations described above. For example, the flow of one or more processes or implementations may be controlled by logic unit 1055 alone or in conjunction with API unit 1060.

Figure 11:
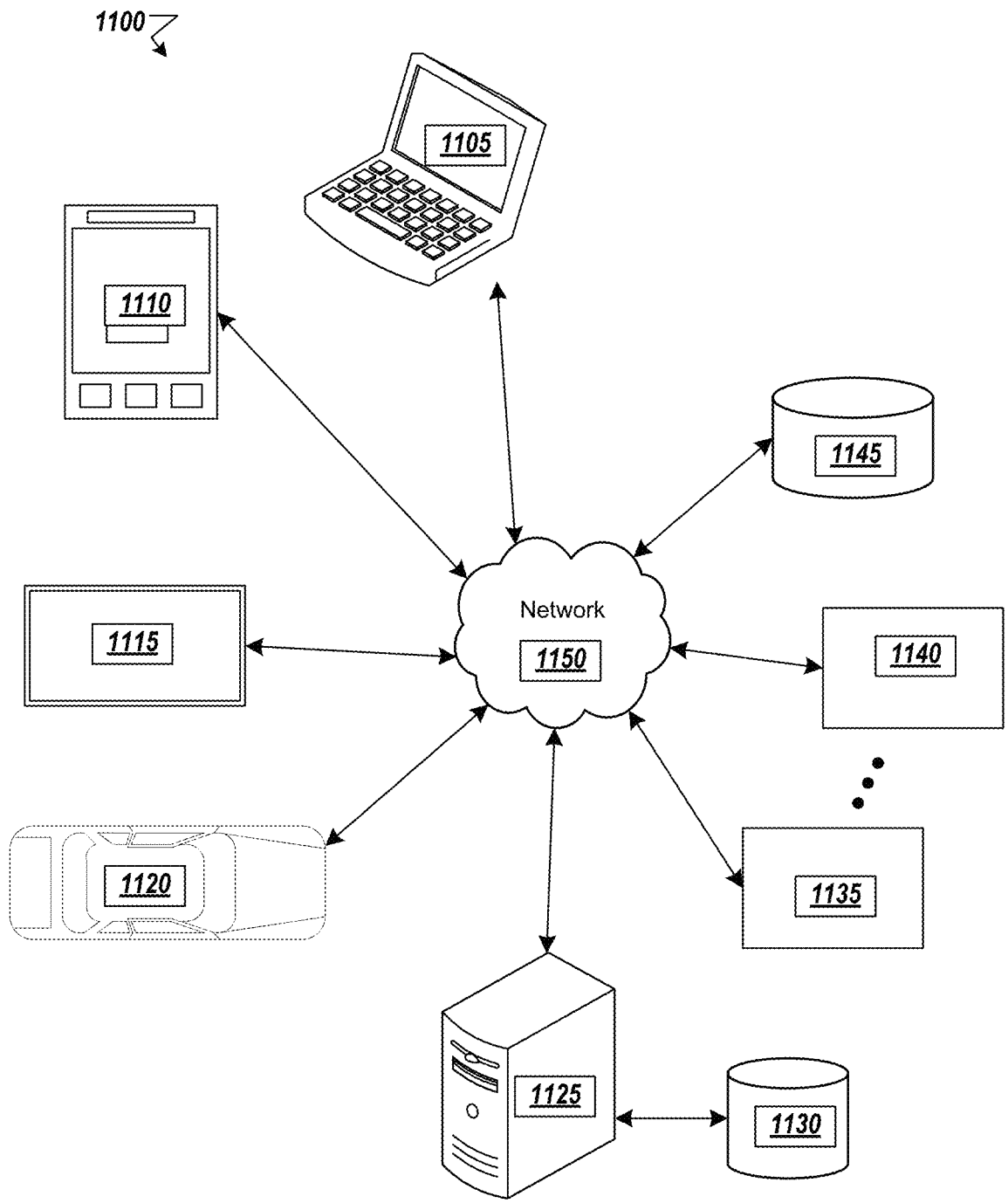
FIG. 11 shows an example environment suitable for some example implementations.

FIG. 11 shows an example environment suitable for some example implementations. Environment 1100 includes devices 1105-1145, and each is communicatively connected to at least one other device via, for example, network 1160 (e.g., by wired and/or wireless connections). Some devices may be communicatively connected to one or more storage devices 1130 and 1145.

An example of one or more devices 1105-1145 may be computing devices 1005 described in FIG. 10, respectively. Devices 1105-1145 may include, but are not limited to, a computer 1105 (e.g., a laptop computing device) having a monitor and an associated webcam as explained above, a mobile device 1110 (e.g., smartphone or tablet), a television 1115, a device associated with a vehicle 1120, a server computer 1125, computing devices 1135-1140, storage devices 1130 and 1145.

In some implementations, devices 1105-1120 may be considered user devices associated with the users of the enterprise. Devices 1125-1145 may be devices associated with service providers (e.g., used by the external host to provide services as described above and with respect to the various drawings, and/or store data, such as webpages, text, text portions, images, image portions, audios, audio segments, videos, video segments, and/or information thereabout).

Figure 12:
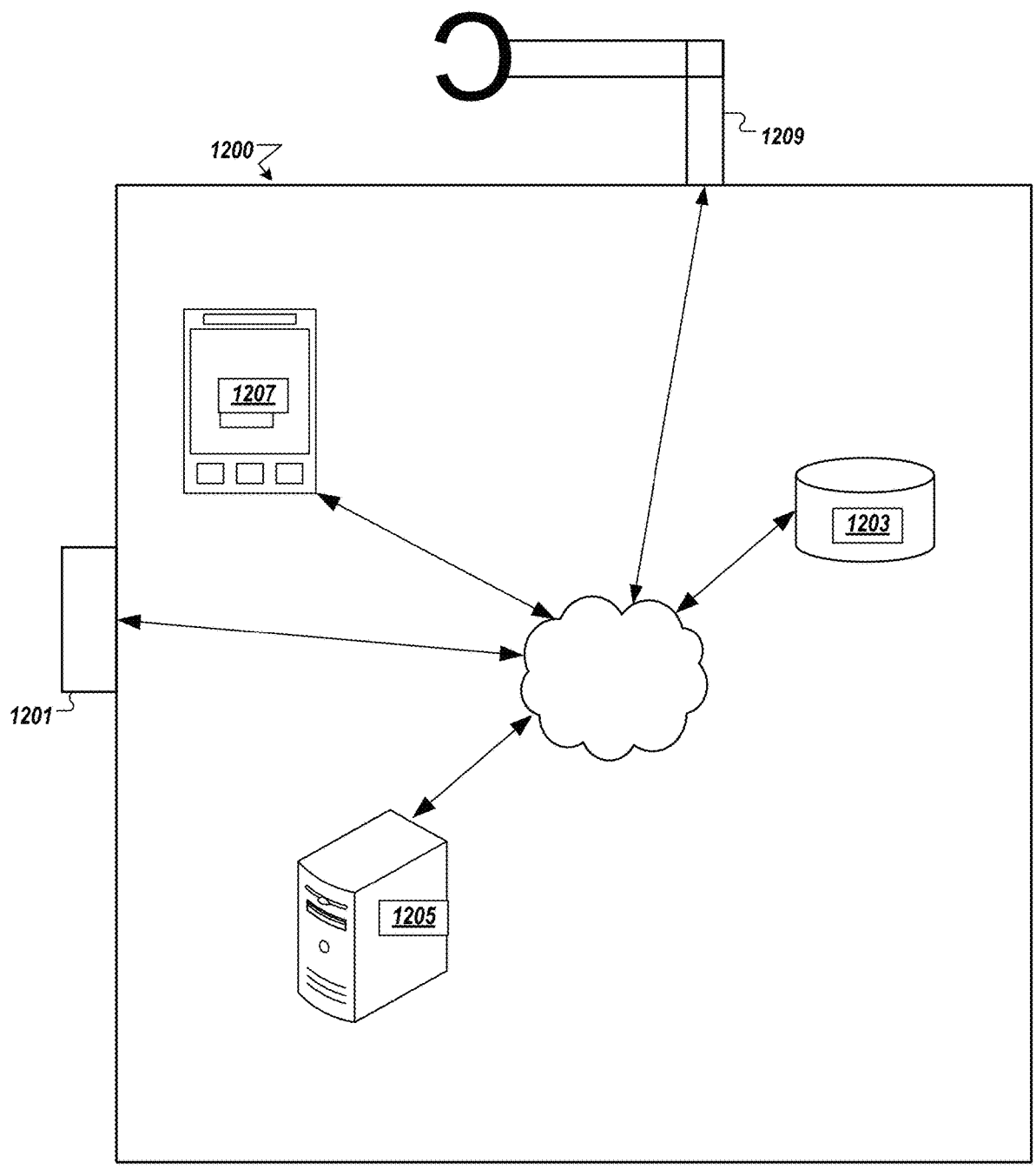
FIG. 12 illustrates an example implementation that is associated with the application of a robot.

FIG. 12 illustrates an example implementation that is associated with the application of a robot. More specifically, at 1200, a robot is represented. The robot may include a sensor 1201 that is coupled either by direct connection or wireless communication to provide input to the robot. Plural sensors may be provided, each being associated with one or more modalities. At 1203, a storage is provided that includes instructional information associated with the present example implementations, such as executable computer instructions, as well as data received from the sensor 1201. At 1205 a processor, such as a microprocessor or CPU, is provided that receives the instructions and data from a storage 1203, which may be located remotely or within the robot. Further, it is noted that the sensor 1201 may also directly provide data to the processor 1205, either remotely or within the robot.

The processor 1205 performs the various operations described in the forgoing example implementations, and generates output commands and data. The output commands and data may be provided, for example to a player at 1207 that outputs information in one or more modalities, as well as to a device at 1209 that performs an action, such as a motor or the like. While the drawing of FIG. 12 shows communication by way of a network, the elements shown therein may be directly connected to one another without departing from the inventive scope, such as using the internal circuitry of the robot 1200.

The foregoing example implementations may have various advantages and benefits over the related art. For example, but not by way of limitation, related art approaches to machine learning have been explored for style transfer within a single modality, but for cross sensory media associations the related art only employees text labeling as a branch. The example implementations take advantage of the advancement and wide adoption of IOT type sensors such as cameras and microphones sensors, to provide a novel way of associating audiovisual sensory data, without requiring text labels.

Further, while related art approaches exist that convert speech to text, and use text to retrieve images. However, speech to text requires a predefined speech recognition engine, while the foregoing example implementations do not require a pre-existing speech engine for a machine to learn. Related art approaches that require priest existing speech engines also create difficulties for the machine learning to be performed directly from the sensory data.

Additionally, and in contrast to related art approaches that use common latent space for images and speech, the example implementations are directed to the use of mapping between two embeddings. More specifically, using a common latent space, as in the related art, requires the system to replace single shared latent space with respective separate latent spaces, which in turn increases the dimensionality of the manifold substantially, and further, introduces an objective function to force two separated spaces close to each other. This related art approach may also create interference between different modalities. By using the present example implementation, which includes a learning structure that is directed to decoupled learning of each modality, and generating nonlinear modality links separately, the related art problems and disadvantages associated with modality interference are avoided, while the example implementation may continue to learn nonlinear relations between two modalities.

Additionally, the example implementations also differ from related art approaches that only involve data from one modality such as text, by building bridges between two different modalities, such as images and audios. Thus, the example implementations are able to handle data with asymmetric dimensions and structures across two modalities which the related art solution cannot solve for. Further, use of lookup tables instead of a neural network approach is not an option as compared with related art lookup tables, because the ability to achieve the same function with the lookup table as with the example implementations using the CNN based autoencoders as explained above cannot be achieved due to space and storage limitations on a lookup table which would become memory space inefficient if attempted.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method of learning sensory media association, comprising:
   receiving a first type of nontext input and a second type of nontext input;
   encoding and decoding the first type of nontext input using a first autoencoder having a first convolutional neural network, and the second type of nontext input using a second autoencoder having a second convolutional neural network;
   bridging first autoencoder representations and second autoencoder representations by a first deep neural network that learns mappings from the first autoencoder representations associated with a first modality to the second autoencoder representations associated with a second modality and a second deep neural network that learns mappings from the second autoencoder representations associated with the second modality to the first autoencoder representations associated with the first modality, wherein the second deep neural network is different from the first deep neural network; and
   based on the encoding, decoding, and the bridging, generating a first type of nontext output and a second type of nontext output based on the first type of nontext input or the second type of nontext input in either the first modality or the second modality.

2. The computer-implemented method of claim 1, wherein the first type of nontext input is audio, and the second type of nontext input is an image.

3. The computer-implemented method of claim 2, wherein the audio is sensed by a microphone and the image is sensed by a camera.

4. The computer-implemented method of claim 1, wherein the first type of nontext input is one of audio, image, temperature, touch, and radiation, and the second type of nontext input is another of audio, image, temperature, touch, and radiation.

5. The computer-implemented method of claim 1, wherein the first type of nontext input and the second type of nontext input are provided to an autonomous robot for training.

6. The computer-implemented method of claim 1, wherein text labels are not used, and the receiving, encoding, decoding, bridging and generating are language-independent.

7. The computer-implemented method of claim 1, wherein a third type of nontext input is received, the third type of nontext input is encoded using a third autoencoder having a third convolutional neural network, the third autoencoder is bridged to the first autoencoder and the second autoencoder by the deep neural network that learns mappings between the third type of representation associated with a third modality and the first type of representation and the second type of representation, and a third type of nontext output is generated, without requiring a retraining of the first autoencoder, the second autoencoder, the first convolutional neural network and the second convolutional neural network.

8. A non-transitory computer readable medium having executable instructions stored in a storage and executed on a processor, the instructions comprising:
   receiving a first type of nontext input and a second type of nontext input;
   encoding and decoding the first type of nontext input using a first autoencoder having a first convolutional neural network, and the second type of nontext input using a second autoencoder having a second convolutional neural network;
   bridging first autoencoder representations and second autoencoder representations by a first deep neural network that learns mappings from the first autoencoder representation associated with a first modality to the second autoencoder representation associated with a second modality and a second deep neural network that learns mappings from the second autoencoder representations associated with the second modality to the first autoencoder representations associated with the first modality; and
   based on the encoding, decoding, and the bridging, generating a first type of nontext output and a second type of nontext output based on the first type of nontext input or the second type of nontext input in either the first modality or the second modality.

9. The non-transitory computer readable medium of claim 8, wherein the first type of nontext input is audio, and the second type of nontext input is an image.

10. The non-transitory computer readable medium of claim 9, wherein the audio is sensed by a microphone and the image is sensed by a camera.

11. The non-transitory computer readable medium of claim 8, wherein the first type of nontext input is one of audio, image, temperature, touch, and radiation, and the second type of nontext input is another of audio, image, temperature, touch, and radiation.

12. The non-transitory computer readable medium of claim 8, wherein the first type of nontext input and the second type of nontext input are provided to an autonomous robot for training.

13. The non-transitory computer readable medium of claim 8, wherein text labels are not used, and the receiving, encoding, decoding, bridging and generating are language-independent.

14. The non-transitory computer readable medium of claim 8, wherein a third type of nontext input is received, the third type of nontext input is encoded using a third autoencoder having a third convolutional neural network, the third autoencoder is bridged to the first autoencoder and the second autoencoder by the deep neural network that learns mappings between the third type of representation associated with a third modality and the first type of representation and the second type of representation, and a third type of nontext output is generated, without requiring a retraining of the first autoencoder, the second autoencoder, the first convolutional neural network and the second convolutional neural network.

15. A computer-implemented system for learning sensory media association, comprising:
   a first type of sensor receiving a first type of nontext input and a second type of sensor receiving a second type of nontext input;
   a processor, that receives the first type of nontext input and the second type of nontext input, encodes and decodes of the first type of nontext input using a first autoencoder having a first convolutional neural network, and the second type of nontext input using a second autoencoder having a second convolutional neural network, and bridges first autoencoder representations and second autoencoder representations by a first deep neural network that learns mappings from the first autoencoder representation associated with a first modality to the second autoencoder representation associated with a second modality and a second deep neural network that learns mappings from the second autoencoder representations associated with the second modality to the first autoencoder representations associated with the first modality; and
   an output device that, based on the encoding, decoding, and the bridging, generates a first type of nontext output and a second type of nontext output based on the first type of nontext input or the second type of nontext input in either the first modality or the second modality.

16. The computer-implemented system of claim 15, wherein the first type of sensor is a microphone and the second type of sensor is a camera.

17. The computer-implemented system of claim 15, wherein the first type of nontext input is one of audio, image, temperature, touch, and radiation, and the second type of nontext input is another of audio, image, temperature, touch, and radiation.

18. The computer-implemented system of claim 15, wherein the first type of nontext input and the second type of nontext input are provided to an autonomous robot for training.

19. The computer-implemented system of claim 15, wherein text labels are not used, and the receiving, encoding, decoding, bridging and generating are language-independent.

20. The computer-implemented system of claim 15, wherein a third type of nontext input is received, the third type of nontext input is encoded using a third autoencoder having a third convolutional neural network, the third autoencoder is bridged to the first autoencoder and the second autoencoder by the deep neural network that learns mappings between the third type of representation associated with a third modality and the first type of representation and the second type of representation, and a third type of nontext output is generated, without requiring a retraining of the first autoencoder, the second autoencoder, the first convolutional neural network and the second convolutional neural network.

* * * * *